Sept. 30, 1930.  P. A. PARADIS ET AL  1,776,978
STEERING POLE FOR AUTO TRAILERS
Filed Oct. 6, 1926  3 Sheets-Sheet 3
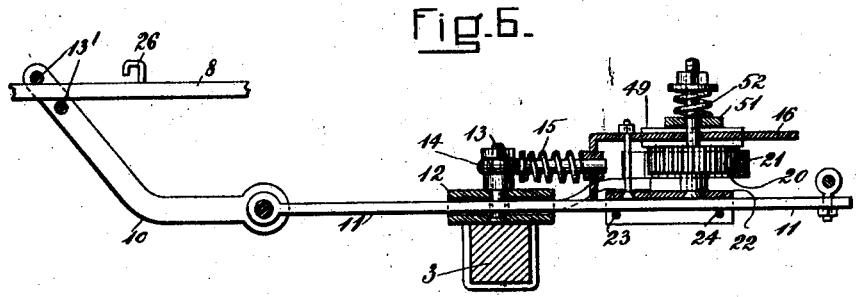
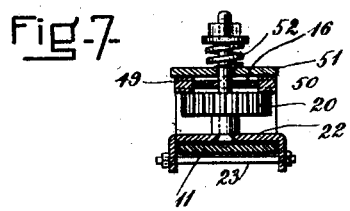
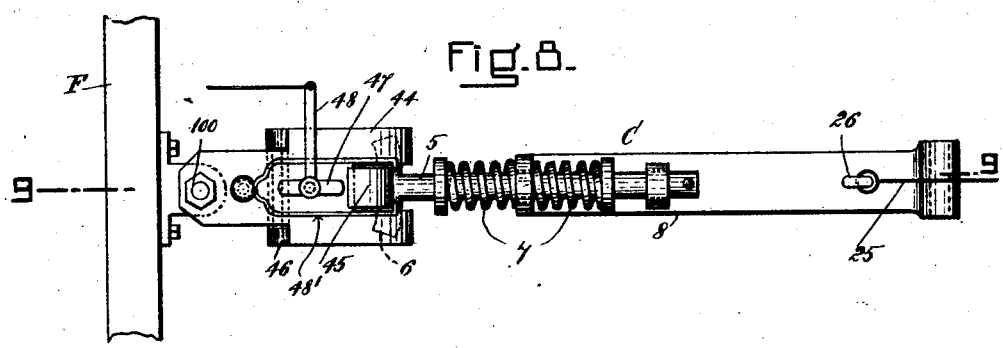
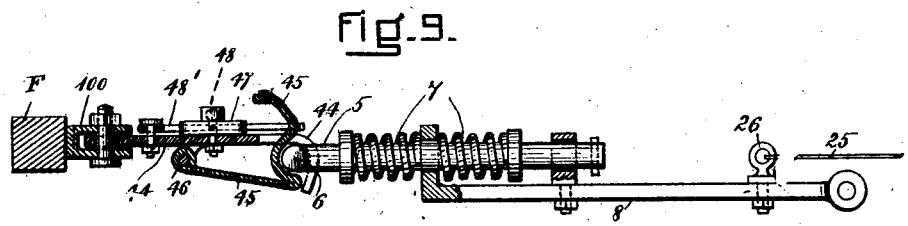
INVENTORS:
Jean Baptiste Masse
Philippe A. Paradis
BY Roger E. David
ATTORNEY:

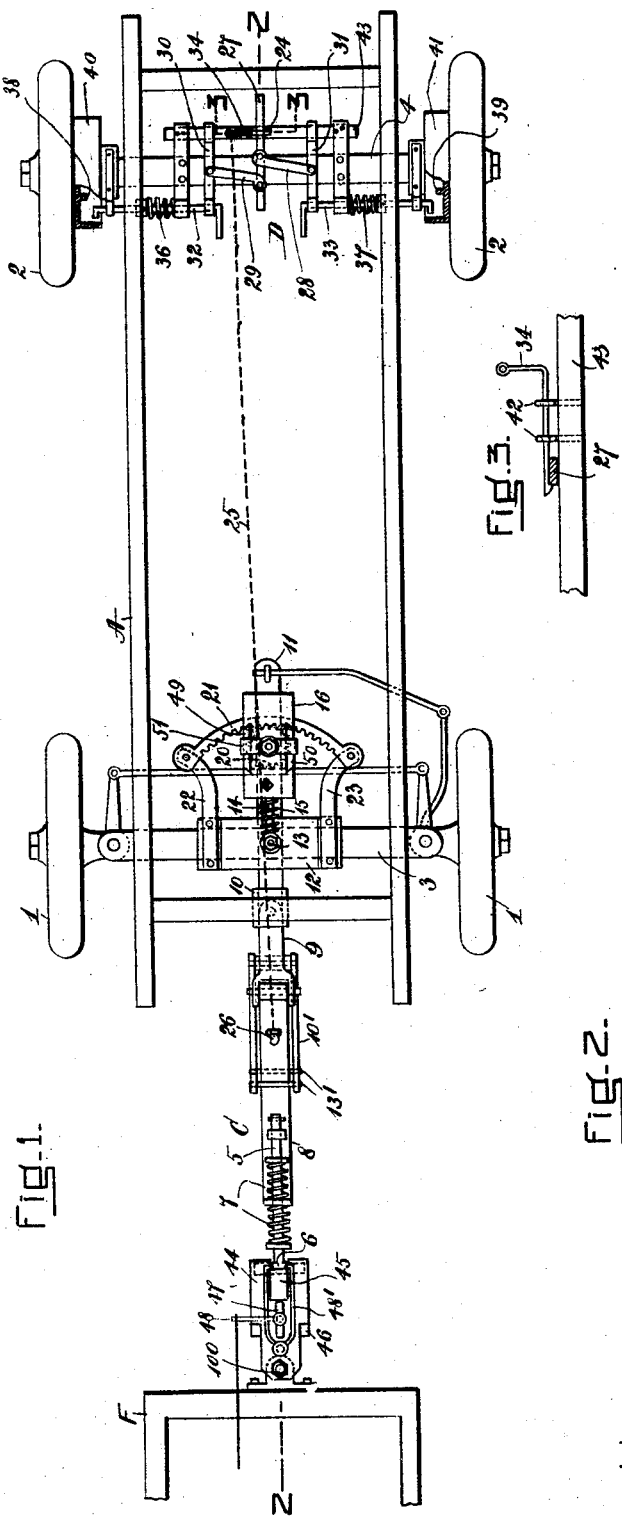

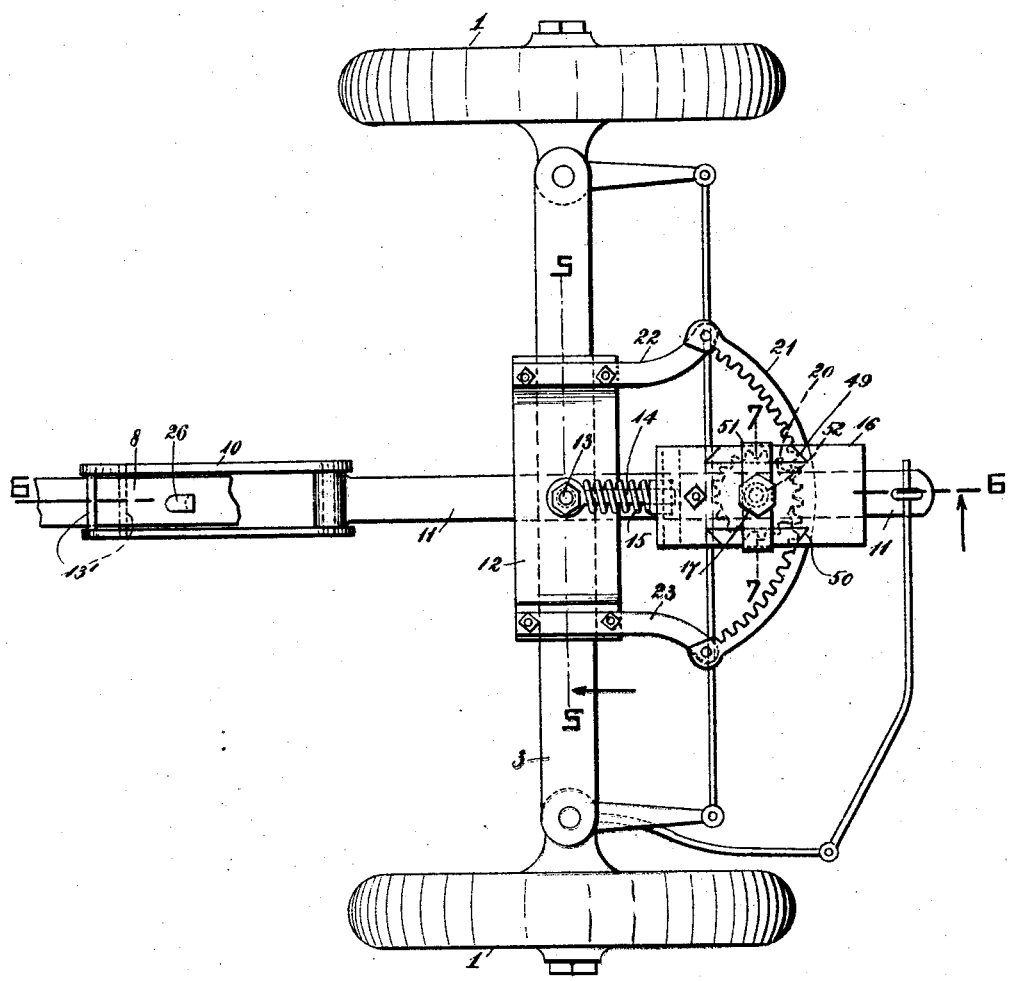
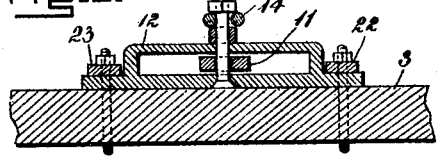

Patented Sept. 30, 1930

1,776,978

UNITED STATES PATENT OFFICE

PHILIPPE A. PARADIS, OF NORTH ANDOVER, AND JEAN BAPTISTE MASSÉ, OF LAWRENCE, MASSACHUSETTS

STEERING POLE FOR AUTO TRAILERS

Application filed October 6, 1926. Serial No. 139,918.

It is essential that the trailer shall follow the auto in a straight line, and not move from side to side as is the case with the trailers heretofore made, and it is also quite essential that the trailer shall stand perfectly still when released from the coupling device.

In our invention we have shown a steering device and an automatically acting brake which operates as soon as the steering pole is released from coupling.

We attain these objects by the mechanism illustrated and described in the accompanying specification and drawings in which:

Fig. 1 is a plan view of our trailer device.

Fig. 2 is a section on line 2—2 of Fig. 1.

Fig. 3 is an enlarged section on line 3—3 of Fig. 1, showing brake releasing catch.

Fig. 4 is an enlarged plan view of my improved steering mechanism.

Fig. 5 is a section on line 5—5 of Fig. 4.

Fig. 6 is a section on line 6—6 of Fig. 4.

Fig. 7 is a section on line 7—7 of Fig 4.

Fig. 8 is an enlarged plan of my coupling device with part of steering pole attached.

Fig. 9 is a section on line 9—9 of Fig. 8.

In the accompanying drawings, A represents a trailer having front wheels 1, and rear wheels 2, and these are mounted in the usual way on the axles 3 and 4 respectively.

The coupling pole C which is a part of the steering device is composed of five parts, of which 5 is a round bar with a crosshead 6 at one end to engage with coupling.

7 are springs on said bar for receiving the shock.

8 is a bar that straddles bar 5 between said springs 7. This is pivoted to swing in a short bar 9, which is pivoted and can turn in bracket 10, this bracket is attached rigidly to cross frame of trailer. 10' is a yoke that straddles bar 8 and has two round iron bars 13', one over bar 8 and one under so that the yoke 10' can slide on bar 8, when steering pole is released from coupling. Bar 11 which is also a part of steering pole extends through opening in plate 12 which is shown in Fig. 5 and is loosely pivoted to said plate so that it can turn therein.

Attached to the pivot 13 in said plate 12 is a rod 14, carrying spring 15, said spring pressing against the end wall of the top frame 16 of our improved steering device.

Attached to this frame 16 and connected thereto by shaft 17 is a gear 20 which meshes with internal gear 21, this internal gear is an arc of a circle, and is connected at each end by arms 22 and 23 rigidly connected to plate 12 which plate is fastened to the front axle 3. This arc which has an internal gear 21 is so placed that when the steering pole turns to one side or the other, the gear 20 presses hard against internal gear 21, causing spring 15 to contract and thereby cause greater friction. By this means the steering pole and connections always tend to come back at once to center, when pole assumes a normal position, which is in a direct straight line.

The frame work 16 has connected to it at bottom and resting on part of pole 11 a bottom plate 22 which has turned down edges to straddle bar 11, and held loosely to same so that gear 20 and frame work 16 can move easily on bar 11.

To these turned edges on plate 22 I attach two rods 23 and 24, said rods reach from side to side and are attached to the turned edges of plate 22, so that the gear 20 and frame work 16 and 22 will move from side to side with bar 11 which is part of the steering pole. You will notice that the top frame work on the gear casing 16 has two side blocks 49 and 50 which run in dovetails in top casing 16, and reaching across from side to side is a plate 51 which rests on the side blocks 49 and 50. On top of this plate is a spring 52 which holds plate 51 in contact with movable blocks 49—50. The object of these blocks is to cause friction on gear 20 as the said blocks rest on the gear 20 and are pressed down by plate 51 and springs 53.

Attached to bar 8 of the steering pole C is a hook or eye 26 to which is attached a rod 25 shown in dotted lines in Figs. 1 and 2. This rod connects with revolving latch 34 on brake setting device D.

My brake setting device consists of a releasing and setting lever 27 to which are attached arms 28 and 29, the outer ends of these arms being attached to bars 30 and 31. Through the front ends of these movable arms 30 and 31 run the brake setting rods 32 and 33.

When the pole and connections are released from the coupling and drop down, the connecting rod 25 pulls on revolving catch and turns same, thereby releasing lever 27 so that brake rods are forced into brake drums 40 and 41 by springs 36 and 37, and thereby setting brakes by coming in contact with stops 38 and 39 on inside of brake drums 40—41.

To reset the brake mechanism pull on lever 27 by hand which is held by catch 34. The revolving catch runs through eyelets 42 attached to rod 43 which is part of the frame work, the same being rigidly attached to the rear axle 4.

Our improved coupling which is a necessary part of my invention is composed of upper and lower sections or plates 44 and 45. These sections are hinged at rear end 46 and formed at front ends so that they encircle head of cross bar 5 which comprises part of the steering pole C. On top of plate 44 is a spring 48' which holds coupling closed. This spring grips each side of the plate 45 which extends up through to plate 44. To release coupling I employ a cam 47 which is operated by a lever 48. By turning said lever the spring 48' is forced apart, thereby releasing bottom plate 45 which causes pole C and connections to drop, thereby setting the brake instantly.

Said coupling is attached to frame F of auto by a swivel arrangement 100, which allows coupling to move with steering pole C.

Having now fully described our invention, what we claim as new, and desire to secure by Letters Patent is:—

1. An anti-swaying attachment for a vehicle steering pole comprising a stationary gear segment, a gear operatively associated therewith, a mounting for the gear slidably carried by the pole, said pole and said mounting being pivoted for movement about an axis eccentric to the segment and spring means yieldably urging the gear into engagement whereby to restrain pivotal movement of the poles.

2. An attachment for a vehicle steering pole, comprising a stationary internal gear segment, a gear operatively associated therewith, a mounting for the gear slidably carried by the pole, a pin providing a pivotal mounting for the pole, said segment being eccentric to said pin, an arm pivoted to the pin having one end slidably inserted in the mounting and an expansible spring interposed between the pin and the mounting for yieldably urging the gear into engaged position whereby to return the pole to a predetermined position.

In testimony whereof we have affixed our signatures.

JEAN BAPTISTE MASSÉ.
PHILIPPE A. PARADIS.